(No Model.)

O. TIPPY.
CARPET STRETCHER.

No. 462,781. Patented Nov. 10, 1891.

Witnesses:
Sam. E. Curtis.
A. M. Munday,

Inventor:
Oren Tippy
By Munday, Evarts & Adcock
His Attorneys.

UNITED STATES PATENT OFFICE.

OREN TIPPY, OF NEW CARLISLE, INDIANA.

CARPET-STRETCHER.

SPECIFICATION forming part of Letters Patent No. 462,781, dated November 10, 1891.

Application filed October 8, 1890. Serial No. 367,426. (No model.)

*To all whom it may concern:*

Be it known that I, OREN TIPPY, a citizen of the United States, residing in New Carlisle, in the county of St. Joseph and State of Indiana, have invented a new and useful Improvement in Carpet-Stretchers, of which the following is a specification.

This invention relates to the construction of carpet-stretchers; and it consists in the novel features and combinations of parts, hereinafter described and claimed.

Figure 1:
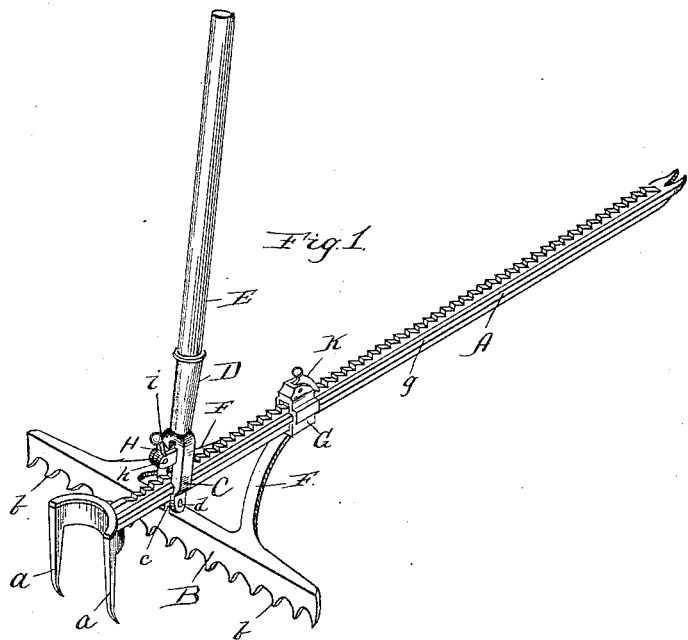
Figures 2, 3:
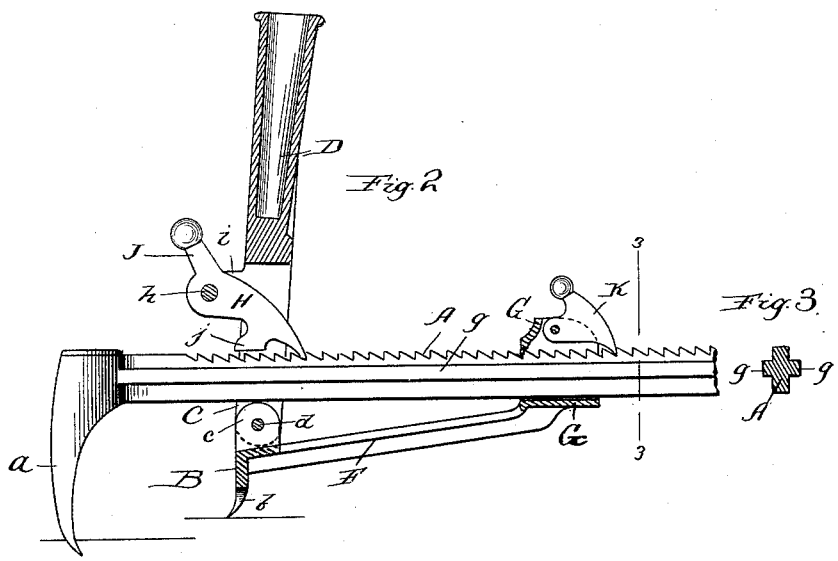

The drawings show at Figure 1 a perspective view of my improved stretcher. Fig. 2 is a longitudinal vertical section of the same. Fig. 3 is a transverse section on the line 3 3 of Fig. 2.

In said drawings, A represents the rack-bar, carrying at its forward end one or more teeth $a$, adapted to be forced into the floor and serve as a means of holding the rack-bar. Sliding upon this rack-bar is the toothed dog B, provided with a series of teeth $b$, adapted to engage with the carpet. This dog is sustained from the rack-bar by arms C, extending downwardly on either side of the rack-bar from the socket D of the operating-lever E and forming extensions of said socket. An upwardly-extending boss $c$ is attached to the dog and enters the space between the lower end of the arms C, and also receives the pivot $d$, which is inserted through the arms. The lever E is vibrated upon this pivot. Extending rearwardly from the dog are braces F, which are united, and preferably in one piece with a slide G encircling the rack-bar. This slide is shaped to correspond to the cross-section of the rack-bar, being provided with lateral enlargements to receive the side ribs $g$ of the bar and be sustained thereby. The braces F and slide G extend backwardly from the dog, as stated, in order that the latter may be moved clear up to the teeth $a$ of the rack-bar and carry the carpet to the extreme of the movement permitted the dog upon the bar.

For feeding forward the dog I employ the pawl H, pivoted at $h$ to the arms $i$, extending forwardly from the arms C, the pawl being located between said arms C. This pawl is weighted, so that normally it will remain in engagement with the rack; but it is provided with an upward extension J, which enables the operator to lift the pawl from engagement with the rack at will; but said pawl may also be raised from engagement by inclining the operating-lever forwardly from the vertical, thereby lowering the pivotal point $h$ and bringing the downward projection $j$, with which the pawl is provided, upon the rack-teeth, thus causing the point of the pawl to lift above the rack and remain in such position as long as the lever is thus inclined forward. When it is desired to move the dog back upon the rack preparatory to taking a fresh hold of the carpet, the pawl H may be thus kept out of engagement with the rack, so that it will not interfere with the retraction of the dog.

To retain the tension brought upon the carpet by the dog during the intervals while the pawl H is being moved from one tooth to another of the rack, a retaining-pawl K is also employed. This pawl is a gravity-pawl, so that its normal position is one of engagement with the rack, and it is pivoted in the slide G. It is readily thrown out of engagement by the operator, however, and when thrown over to the left of the position shown at Fig. 2 its center of gravity will be on the other side of the pivot, and it will retain that position as long as desired. Of course it is thus thrown over when the dog is to be retracted.

I claim—

In a carpet-stretcher, the combination, with the carpet-dog, the rack-bar, the retaining-pawl, and the slide carrying such pawl and joined to the carpet-dog, of the operating-lever and its pawl H, the latter being provided with a projection $j$, adapted to bear on the rack-bar and lift the pawl from its engagement when the lever is inclined, substantially as specified.

OREN TIPPY.

Witnesses:
G. S. DRULINER,
JOHN W. SHURTS.